(12) United States Patent
Kirsch

(10) Patent No.: US 11,876,841 B2
(45) Date of Patent: Jan. 16, 2024

(54) DISPARATE PLAYER MEDIA SHARING

(71) Applicant: Honda Motor Co., Ltd., Tokyo (JP)

(72) Inventor: David M. Kirsch, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/381,960

(22) Filed: Jul. 21, 2021

(65) Prior Publication Data

US 2023/0021565 A1   Jan. 26, 2023

(51) Int. Cl.
| | | |
|---|---|---|
| *G06F 15/16* | (2006.01) | |
| *H04L 65/40* | (2022.01) | |
| *G06F 9/54* | (2006.01) | |
| *H04L 67/146* | (2022.01) | |
| *H04L 67/12* | (2022.01) | |

(52) U.S. Cl.
CPC ............. *H04L 65/40* (2013.01); *G06F 9/547* (2013.01); *H04L 67/146* (2013.01); *H04L 67/12* (2013.01)

(58) Field of Classification Search
CPC ....... H04L 65/40; H04L 67/146; H04L 67/12; G06F 9/547
USPC .................................. 709/202–203, 217–219
See application file for complete search history.

(56) References Cited

U.S. PATENT DOCUMENTS

| | | | |
|---|---|---|---|
| 8,918,484 B2 | 12/2014 | Moncavage et al. | |
| 9,451,312 B2 | 9/2016 | Zhang et al. | |
| 9,860,662 B2 | 1/2018 | Jarvis et al. | |
| 9,921,799 B2 | 3/2018 | Touch et al. | |
| 9,959,343 B2 | 5/2018 | Sharma et al. | |
| 10,268,808 B2 | 4/2019 | Yske | |
| 10,838,686 B2 | 11/2020 | Kovacevic | |
| 2006/0143236 A1 | 6/2006 | Wu | |
| 2011/0047597 A1* | 2/2011 | Mahaffey | H04L 67/01 709/219 |
| 2013/0198633 A1 | 8/2013 | Hyman | |
| 2014/0222952 A1* | 8/2014 | Suryavanshi | H04L 67/10 709/217 |
| 2014/0250147 A1* | 9/2014 | Shapira | H04L 67/02 707/770 |
| 2015/0222680 A1* | 8/2015 | Grover | H04L 65/4084 709/204 |
| 2015/0317484 A1* | 11/2015 | Bowden | H04W 4/80 726/26 |
| 2016/0162252 A1* | 6/2016 | Di Censo | H04L 67/125 700/94 |
| 2017/0024399 A1 | 1/2017 | Boyle et al. | |
| 2017/0068693 A1* | 3/2017 | Macksood | G06F 16/9562 |
| 2018/0039698 A1* | 2/2018 | Lewis | G06Q 10/10 |

(Continued)

OTHER PUBLICATIONS

What is Rythm?, 2021, https://rythm.fm/docs/start/.

*Primary Examiner* — Bharat Barot
(74) *Attorney, Agent, or Firm* — RANKIN, HILL & CLARK LLP

(57) ABSTRACT

Systems and techniques for sharing media may utilize or implement a server receiving a media share request from a first device associated with a first user, the media share request including metadata pertaining to a media, retrieving a set of candidate media and fine tuning the set of candidate media to determine a selected candidate media, and transmitting metadata associated with the selected candidate media to a second device associated with a second user or transmitting a set of application program interface (API) calls to the second device.

19 Claims, 9 Drawing Sheets

(56) References Cited

U.S. PATENT DOCUMENTS

| | | |
|---|---|---|
| 2019/0014167 A1* | 1/2019 | Rao .................. H04L 67/10 |
| 2019/0018644 A1 | 1/2019 | Kovacevic et al. |
| 2019/0173818 A1* | 6/2019 | Friedman ............. H04L 51/063 |
| 2020/0159487 A1 | 5/2020 | Dawson et al. |
| 2021/0004402 A1 | 1/2021 | Li et al. |
| 2021/0099357 A1* | 4/2021 | Pepper .................. G06Q 10/10 |
| 2021/0192949 A1* | 6/2021 | Shin .................. H04W 4/46 |
| 2021/0306826 A1* | 9/2021 | Yamane .................. H04W 4/46 |
| 2021/0312724 A1* | 10/2021 | Petri .................. H04L 67/12 |

* cited by examiner

DISPARATE PLAYER MEDIA SHARING

BACKGROUND

Generally, media sharing services produce and distribute a uniform resource locator (URL) corresponding to a service access address. Information which may be included in the URL may include identifying information. A media sharing service may provide user terminals for accessing a media server through the URL. In this way, the user terminal may play the received media through a web player application. However, different users may have different subscriptions to different media services, and not all versions of a given media may be available across different platforms. Currently, for example, one member may share a song with another from a music application service, but the second cannot play it back because they don't have the same music application service.

BRIEF DESCRIPTION

According to one aspect, a system for sharing media may include a server receiving a media share request from a first device associated with a first user, the media share request including metadata pertaining to a media, retrieving a set of candidate media and fine tuning the set of candidate media to determine a selected candidate media, and transmitting a set of application program interface (API) calls to a second device associated with a second user.

The metadata may include a title, an artist, an album, or a unique media identifier. The first user may be subscribed to a first media service and the second user may be subscribed to a second media service. The server may retrieve the set of candidate media and fine tune the set of candidate media to determine the selected candidate media based on the subscription to the second media service by the second user. The server may transmit the set of API calls to the second device based on the subscription to the second media service by the second user. The server may retrieve the set of candidate media and fine tune the set of candidate media to determine the selected candidate media based on the subscription to the second media service by the second user and the subscription to the first media service by the first user. The server may transmit the set of API calls to the second device based on the subscription to the second media service by the second user and the subscription to the first media service by the first user. The server may transmit the set of API calls to the second device based on an application preference of the second user. The set of API calls may include a Uniform Resource Locator (URL). The server may transmit the set of API calls to the second device based on media applications currently installed on the second device.

According to one aspect, a system for sharing media may include a server receiving a media share request from a first device associated with a first user, the media share request including metadata pertaining to a media, retrieving a set of candidate media, fine tuning the set of candidate media to determine a selected candidate media, and transmitting metadata associated with the selected candidate media to a second device associated with a second user.

The metadata associated with the media share request or the metadata associated with the selected candidate media may include a title, an artist, an album, or a unique media identifier. The first user may be subscribed to a first media service and the second user may be subscribed to a second media service. The server may transmit the metadata associated with the selected candidate media to the second device based on the subscription to the second media service by the second user.

According to one aspect, a system for sharing media may include a server receiving a media share request from a first device associated with a first user, the media share request including metadata pertaining to a media and transmitting the metadata pertaining to the media share request to a second device associated with a second user.

The second device may retrieve a set of candidate media and fine tune the set of candidate media to determine a selected candidate media based on the received metadata pertaining to the media share request. The metadata associated with the media share request or the metadata transmitted to the second device may include a title, an artist, an album, or a unique media share request identifier. The first user may be subscribed to a first media service and the second user may be subscribed to a second media service. The server may transmit the metadata pertaining to the media share request to the second device based on the subscription to the second media service by the second user. The second user may not be subscribed to any media service. The server may transmit the metadata pertaining to the media share request to the second device based on the second user having no subscription to any media service.

DETAILED DESCRIPTION

Figure 1:
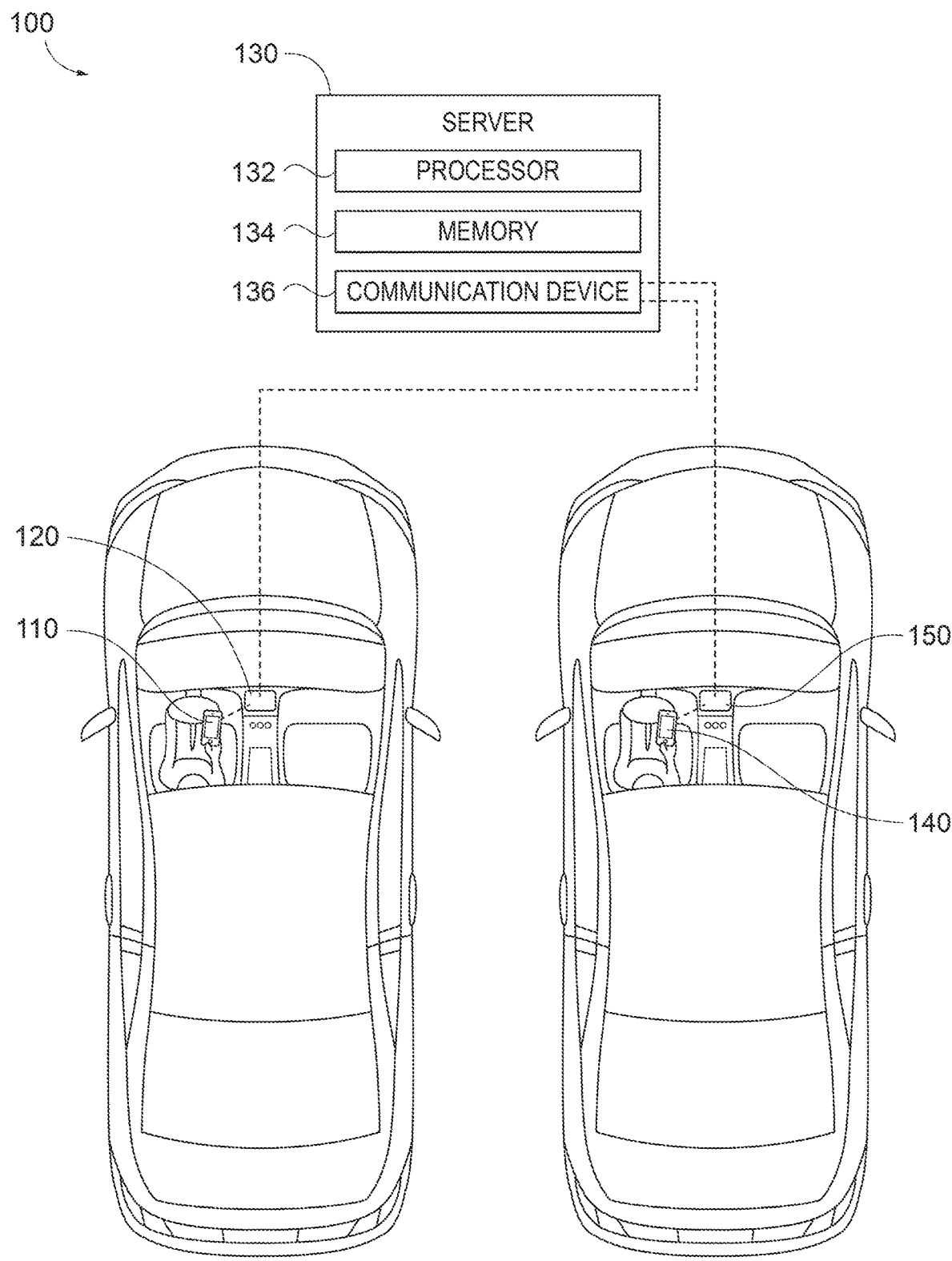
FIG. 1 is an illustrative overview of a system for disparate player media sharing, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multi-core processors and co-processors and other multiple single and multi-core processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, portable electronic devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

FIG. 1 is an illustrative overview of a system for disparate player media sharing, according to one aspect. The system for disparate player media sharing may include components distributed across a first vehicle and/or a first mobile device 110 in computer communication with the first vehicle, a server 130 including a processor 132, a memory 134, and a communication device 138 (e.g., wireless transmitter, receiver, transceiver, etc.), and a second vehicle and/or a second mobile device 140 in computer communication with the second vehicle. Additionally, one or more of the first vehicle, the first mobile device 110, the server 130, the second vehicle, or the second mobile device 140 may be in direct or indirect computer communication with one another or may be operably connected via a wireless communication protocol, such as Bluetooth® or Wi-Fi, for example.

In any event, the first vehicle may include a vehicle entertainment device (e.g., a first vehicle entertainment device 120, which may be mounted to the center console of the vehicle) and the second vehicle may include a vehicle entertainment device (e.g., a second vehicle entertainment device 150, which may be mounted to the center console of the vehicle). FIG. 1 illustrates an implementation where the server 130 may be implemented as a cloud server for computations, and respective devices communicate indirectly, via the cloud server.

According to the exemplary scenario of FIG. 1, the first mobile device 110 may be communicatively coupled with the first vehicle entertainment device 120 via the wireless communication protocol (e.g., Bluetooth®, Wi-Fi, or other near field communication (NFC) protocol), the second mobile device 140 may be communicatively coupled with the second vehicle entertainment device 150 via the wireless communication protocol (which does not necessarily have to be the same as the wireless communication protocol associated with the first mobile device 110), the server 130 may be communicatively coupled with the first vehicle entertainment device 120, and the server 130 may be communicatively coupled with the second vehicle entertainment device 150. This communication between the first vehicle entertainment device 120 and the server 130 and the second vehicle entertainment device 150 and the server 130 may be achieved using any Vehicle to Network (V2N) technology, such as via a cellular network, dedicated short-range communications (DSRC), and Vehicle to Cloud (V2C) communications via broadband and/or cellular mobile networks, for example. According to another aspect, the first vehicle and second vehicle may be capable of direct, computer communication or may be operably connected via Vehicle to Vehicle (V2V) achieved via wireless communication using DSRC frequencies.

Figure 2:
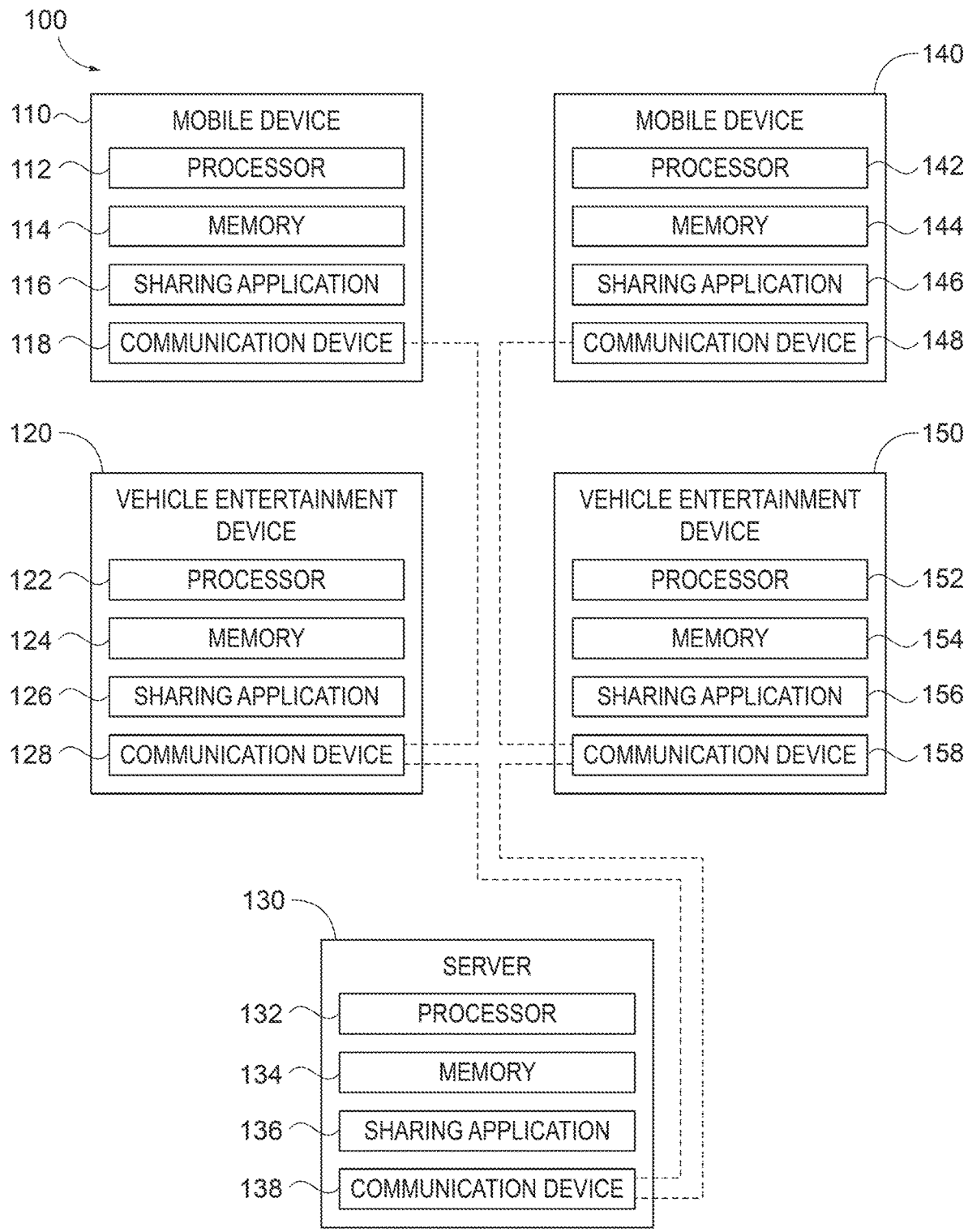
FIG. 2 is a component diagram of a system for disparate player media sharing, according to one aspect.

FIG. 2 is a component diagram of a system for disparate player media sharing, according to one aspect. FIG. 2 illustrates one or more of the components of FIG. 1 in greater detail. For example, the first mobile device 110 may include a processor 112, a memory 114, a storage drive, etc., which may be interconnected via one or more buses. Together, these may be utilized to execute a sharing application 116 which may enable the sharing of media, such as a song, across different devices associated with disparate media players via a communication device 118. For example, a first user of the first mobile device 110 may be subscribed to a first media service or have a first media application installed on the first mobile device 110 while a second user of the second mobile device 140 may be subscribed to a second media service or have a second media application installed on the second mobile device 140. Alternatively, the first user of the first mobile device 110 and/or the second user of the second mobile device 140 may be subscribed to no media services. Occasionally, compatibility issues associated with differences between the first media service and the second media service or the first media application and the second media application may arise. In this regard, the system for disparate player media sharing may resolve such conflicts or issues, as will be discussed in greater detail below.

Returning to FIG. 2, the first vehicle entertainment device 120 may include a processor 122, a memory 124, a storage drive, etc. Together, these may be utilized to execute a sharing application 126 which may enable the sharing of media, such as a song, across different devices via a communication device 128 (e.g., transmitter, receiver, transceiver). As discussed above, the server 130 may include the processor 132, the memory 134, and the communication device 138. The second mobile device 140 may include a processor 142, a memory 144, a storage drive, etc., which may be utilized to execute a sharing application 146 to enable the sharing of media across different devices via a communication device 148. Similarly, the second vehicle entertainment device 150 may include a processor 152, a memory 154, a storage drive, etc., which may be utilized to execute a sharing application 156 to enable the sharing of media across different devices via a communication device 158.

Thus, both the first user and the second user may be connected by utilizing the sharing applications 116, 126, 146, 156, which may not necessarily be the same sharing application, and may further belong to a same group within the sharing application or be 'friends' within the sharing application or linked using a social network (e.g., via signing into the sharing application, etc.). It should be noted that the first and second user do not have to utilize the same sharing application in order for the sharing to occur. The first user may utilize the sharing application 116, 126 to generate a media share request from his or her device, which determines, reads, parses, and transmits metadata pertaining to the song he or she desires to share to the server 130, which may retrieve a set of candidate media and fine tune the candidate media accordingly, such as by comparing the media associated with the media share request to a database from the server 130 for identification. An API call or URL may be transmitted to a second device which, when executed, may initialize the media desired to be shared, thereby enabling sharing without requiring the use or manual launching of the sharing application 146, 156 by the second user in order to receive the shared media.

FIG. 2 illustrates an implementation where the server 130 may be implemented as the cloud server for computations, and respective devices communicate indirectly, via the cloud server. In this regard, the first user of the first mobile device 110 may initiate a media share request via an interface (depicted in FIG. 6) of the first mobile device 110 or an interface (depicted in FIG. 7) of the first vehicle entertainment device 120. According to this aspect, regardless of how the media share request is initiated, the communication device 118 of the first mobile device 110 or the communication device 128 of the first vehicle entertainment device 120 may communicate this media share request to the server 130.

The communication device 118 of the first mobile device 110 may pass or transmit the media share request to the communication device 128 of the first vehicle entertainment device 120, which may then pass or transmit the media share request to the server 130 or the communication device 118 of the first mobile device 110 may communicate with the server 130 directly. For example, if the first mobile device 110 is paired with the first vehicle entertainment device 120 of the first vehicle, the communication device 118 of the first mobile device 110 may pass or transmit the media share request to the communication device 128 of the first vehicle entertainment device 120 to then pass or transmit the media share request to the server 130. Alternatively, if the first mobile device 110 is not paired with the first vehicle entertainment device 120 of the first vehicle, the communication device 118 of the first mobile device 110 may pass or transmit the media share request to the server 130.

According to one aspect, the first mobile device 110 or the first vehicle entertainment device 120 may automatically generate media share requests for media consumed by the first user, thereby sharing media consumed by the first user with the second user. This may be performed based on a 'share all' setting associated with the first user.

Regardless, the server 130 may receive a media share request from a first device (e.g., either the first mobile device 110 or the first vehicle entertainment device 120) associated with the first user. The media share request may include metadata pertaining to the media to be shared. Examples of metadata, as referenced herein, may include a title, an artist, an album, a year recorded, a unique media identifier, a unique song identifier, etc.

The server 130 may utilize the metadata from the media share request to retrieve a set of candidate media and fine tune the set of candidate media to determine a selected candidate media using any known fine tuning techniques. According to one aspect, the server 130 may retrieve the set of candidate media and fine tune or pre-check the set of candidate media to determine the selected candidate media based on subscriptions (or lack of subscriptions) to music services by either user, such as the subscription to the second music service by the second user and/or the subscription to the first music service by the first user. For example, the server 130 may have knowledge of or receive data indicating that the second user has a subscription to the second music service. In this regard, the retrieving of the set of candidate media and the fine tuning of the set of candidate media may be directed toward media from the second music service, for example. In other words, because there may be multiple music services and shared information may be different among music services, the knowledge of subscription of the second user may be utilized to enable the server 130 to parse information more efficiently.

According to one aspect, the server 130 may perform the fine tuning to identify one or more media permutations, one or more ambiguities, different media versions or recordings, artists associated with the same song title and fine tune the media to be as close as possible to the originally submitted media associated with the media share request. The fine tuning may be influenced based on a region of the first user, a region of the second user, by a contractual agreement, subscriptions associated with either user, currently installed applications on either the first device or the second device, etc.

Further, the server 130 may transmit a set of application program interface (API) calls to the second device (e.g., either the second vehicle entertainment device 150 or the second mobile device 140) associated with the second user. According to one aspect, API calls may be made using a Uniform Resource Locator (URL), which may be fully resolved already. As used herein, the first device may refer to one of the first mobile device 110 and/or the first vehicle entertainment device 120 and the second device may refer to one of the second mobile device 140 and/or the second vehicle entertainment device 150. The server 130 may transmit the set of API calls to the second device based on subscriptions to music services by either user, such as the subscription to the second music service by the second user.

In other words, the set of API calls transmitted by the server 130 may be API calls to an application associated with the second music service to which the second user is subscribed. When the second device receives the API call or the set of API calls, the second device may automatically execute the API call, thereby automatically playing the media. This automatic execution may be implemented when the second user is driving or in a sharing acceptance mode, for example. Alternatively, the second device may prompt the second user for permission to begin playing the shared media, and upon confirmation, automatically begin playing the shared media.

According to another exemplary aspect, a list of commonly utilize media platform API calls may be provided and an order of the list may be determined based on applications currently installed on the second device (e.g., second mobile device 140 and/or second vehicle entertainment device 150), an application preference associated with the second user, or based on active subscription services associated with the second user, such as the subscription to the second music service by the second user. In this way, the system for sharing media may share information associated with a song or media, and may be able to read and parse through information to provide an ideal or desired media result (e.g., the correct media utilizing the desired platform) and recommend similar choices based on the information provided.

According to one aspect, the server 130 may generate the API call merely in a scenario when the receiving party (e.g., the second user) does not have the same music service as the sending party (e.g., the first user). Here, for example, the server 130 may generate the API call tailored to applications installed on the second mobile device 140, applications installed on the second vehicle entertainment device 150, subscriptions available to the second user, etc. In this way, the server 130 may create an 'action' via the API to create messages to call up the song or media from another media application or platform when the original platform associated with the media share request is unavailable. From the perspective of the second user, the media would be presented as if the second user merely launched the shared media or URL and/or parsed the song title, artist, or music service application himself or herself. Thus, conversion from one music format to another during the sharing process may be provided.

According to one aspect, the server 130 may parse information, such as the metadata and share the metadata with the second device. The second device may be programmed to filter the metadata to activate one or more API calls according to available applications installed on the second device or based on active or available subscriptions for the second user. In this way, the shared information or metadata may be generated by the server 130 and the receiving system or second device may be programmed to merely utilize the information which is compatible for that secondary user. According to another aspect, all possible information and/or metadata associated with the song or media to be shared may be received by the second device.

According to one aspect, the API call may be resolved by the second device immediately or at a later time, such as when the second user launches a music application (e.g., detected by the second mobile device 140) or when the second user begins a drive or is currently driving (e.g., detected by information from the CAN bus of the second vehicle), for example.

According to another aspect, the server 130 may send alternative API calls to the second device if the second device requests additional API calls. The second device may request additional API calls if it is found that the first transmitted API call is incompatible with the second device. For example, if the second user forgets a login or password to one of his or her music services, the second user may respond to the transmitted API call by pressing the 'forgot password' button, which may transmit this information back to the server 130. In response, the server 130 may generate the alternative API call. As another example, if the second user fails to accept or execute the first transmitted API call within a predetermined time period of activating the vehicle or launching the music application and the second user has a history of accepting within the predetermined time period, the server 130 may generate the alternative API call for the associated media. As yet another example, if the server 130 or music service is temporarily unavailable (e.g., the music server 130 is down or suffering from a denial of service (DDoS) attack), the server 130 may generate the alternative API call for the associated media.

It may not be necessary for the server 130 to transmit API calls to the second device. According to one aspect, the server 130 may be implemented as a cloud server, but be configured to transmit, send or pass along media metadata for the selected candidate media to the second device and a pending share command, and thereafter, the second device may perform its own API call based on the received metadata from the server 130 and the pending share command. In this regard, the server 130 may receive the media share request from the first device associated with the first user, retrieve the set of candidate media, fine tune the set of candidate media to determine a selected candidate media, and transmit metadata associated with the selected candidate media to the second device associated with the second user based on subscriptions to music services by either user, such as the subscription to the second music service by the second user, along with the pending share command, which may be taken or received by the second device to execute its own API call for the corresponding or associated selected candidate media.

It may not be necessary for the server 130 to determine the set of candidate media for the second device. According to one aspect, the second device may retrieve the set of candidate media and fine tune the set of candidate media to determine the selected candidate media based on metadata received pertaining to the media to be shared (e.g., media or song associated with the initial media share request). In this regard, the server 130 may receive the media share request from the first device associated with the first user and transmit the metadata pertaining to the media to the second device associated with the second user based on subscriptions to music services by either user, such as a subscription to the first music service, a subscription to the second music service, or no subscription at all, for example.

In this way, different variations of distributed computing may be applied to the subject disclosure. According to one aspect, the first mobile device 110 and the second mobile device 140 may not necessarily be utilized for disparate player media sharing, and sharing of media may occur directly via the sharing application 126 of the first vehicle entertainment device 120 to the sharing application 156 of the second vehicle entertainment device 150, rather than via the sharing application 116 of the first mobile device 110. According to this aspect, the first vehicle entertainment device 120 may be directly, communicatively coupled to the second vehicle entertainment device 150 (e.g., via V2V communications) or the server 130 may act as an intermediary according to other aspects.

According to one aspect, the first vehicle entertainment device 120 and the second vehicle entertainment device 150 may not necessarily be utilized for disparate player media sharing, and sharing of media may occur directly via the sharing application 116 of the first mobile device 110 to the sharing application 146 of the second mobile device 140, rather than via the sharing application 126 of the first vehicle entertainment device 120. According to this aspect, the first mobile device 110 may be directly, communicatively coupled to the second mobile device 140 (e.g., via Wi-Fi communications) or communications may be routed through the server 130, acting as an intermediary (e.g., via cellular communications).

According to one aspect, the first vehicle entertainment device 120 may not be utilized for disparate player media sharing, and sharing of media may occur directly via the sharing application 116 of the first mobile device 110 to the sharing application 156 of the second vehicle entertainment device 150. Again, this may occur in a variety of ways, such as via Wi-Fi or cellular network and the server 130 may or may not act as an intermediary, depending on the implementation.

According to one aspect, the second vehicle entertainment device 150 may not be utilized for disparate player media sharing, and sharing of media may occur directly via the sharing application 126 of the first vehicle entertainment device 120 to the sharing application 146 of the second mobile device 140. Again, this may occur in a variety of ways, such as via Wi-Fi or cellular network and the server 130 may or may not act as an intermediary, depending on the implementation.

Figure 3:
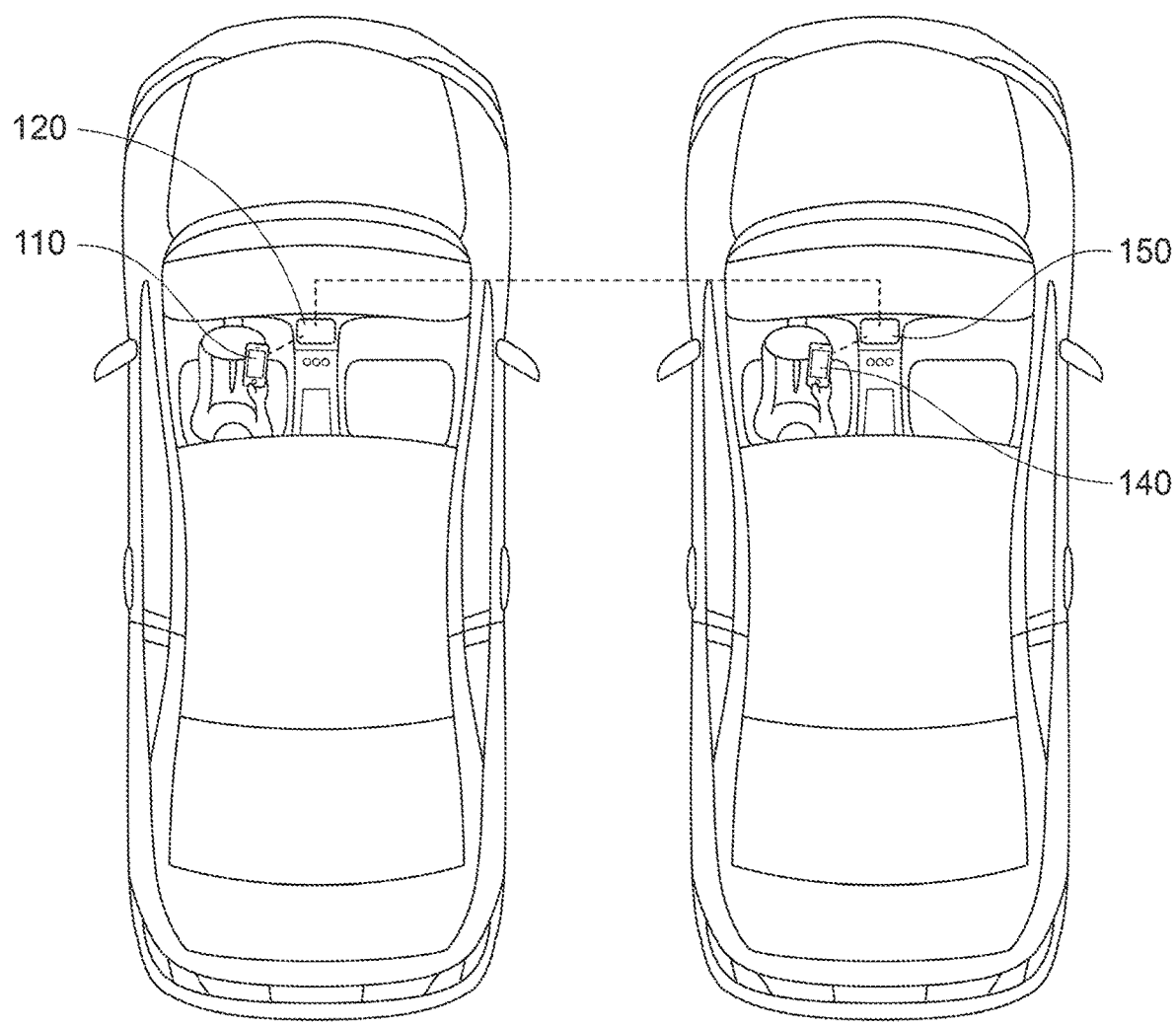
FIG. 3 is an illustrative overview of a system for disparate player media sharing, according to one aspect.
Figure 4:
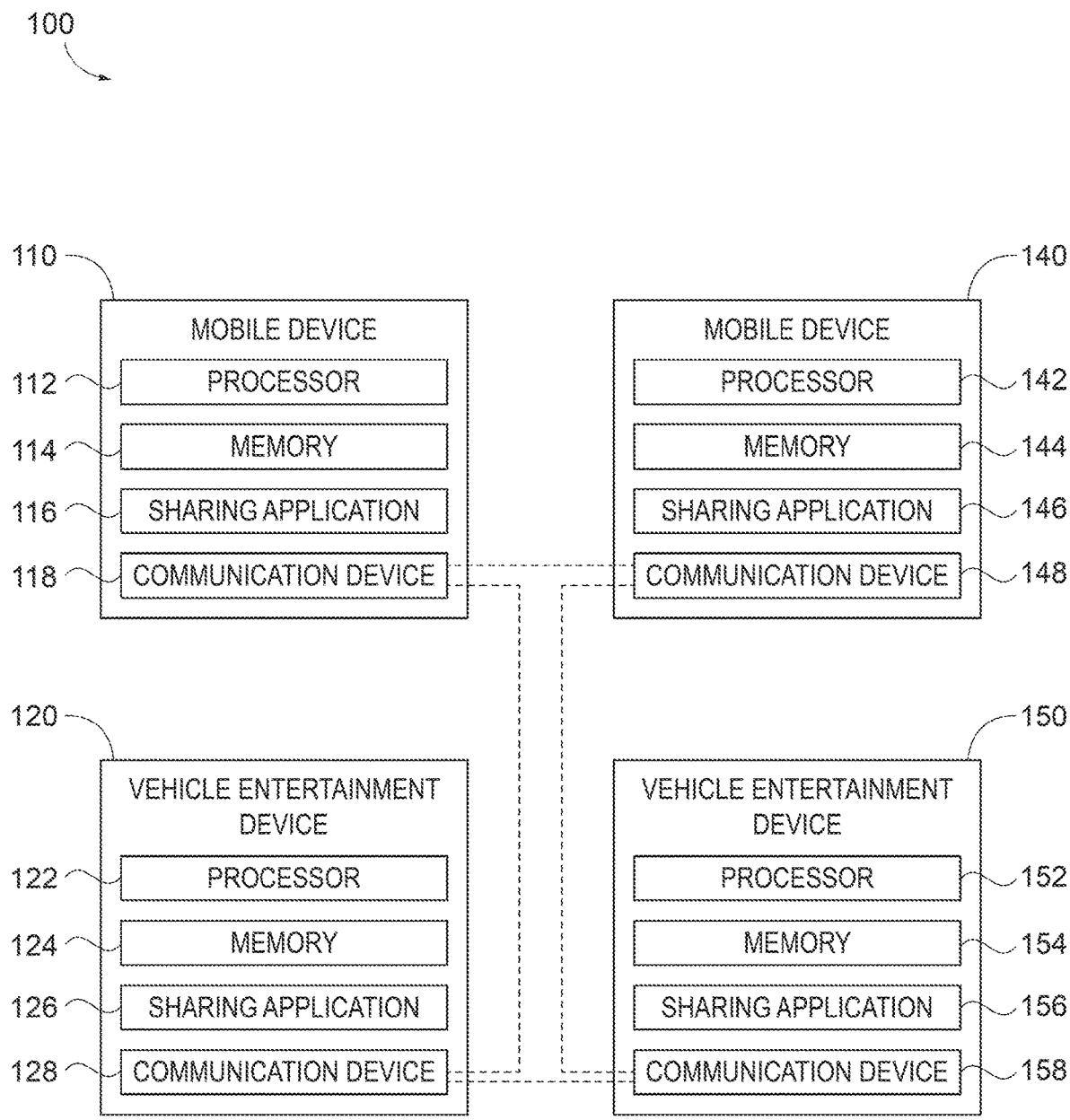
FIG. 4 is a component diagram of a system for disparate player media sharing, according to one aspect.

FIG. 3 is an illustrative overview of a system for disparate player media sharing, according to one aspect. FIG. 3 illustrates an implementation where no cloud server is implemented for computations, and the first vehicle and the second vehicle are in direct V2V computer communication. In this regard, any functions or functionality described with respect to the server 130 may be shifted to either the processor 112 of the first mobile device 110, the processor 142 of the second mobile device 140, the processor 122 of the first vehicle entertainment device 120, or the processor 152 of the second vehicle entertainment device 150 as a distributed system, for example. FIG. 4 is a component diagram of a system for disparate player media sharing, according to one aspect. FIG. 4 illustrates an implementation where no cloud server is utilized for computations, and the first vehicle and the second vehicle are in direct V2V communication.

In this regard, FIGS. 3-4 differ from FIGS. 1-2 merely in that the server 130 of FIGS. 1-2 may not be implemented as a cloud server. Instead, processing or calculations performed by the server 130 may be wholly or partially shifted to the processor 112 of the first mobile device 110, the processor 142 of the second mobile device 140, the processor 122 of the first vehicle entertainment device 120, or the processor 152 of the second vehicle entertainment device 150. For example, the processing of metadata and/or fine tuning may be performed on the sender side (e.g., the first mobile device 110 or the first vehicle entertainment device 120) or the receiver side (e.g., the second mobile device 140 or the second vehicle entertainment device 150).

For example, the second device may receive metadata associated with the song to be shared from the media share request and based on applications currently installed on the second device (e.g., second mobile device 140 and/or second vehicle entertainment device 150). Additionally, the second device may generate its own API call in response to receiving the shared metadata from the server 130 or from the first device.

Figure 5:
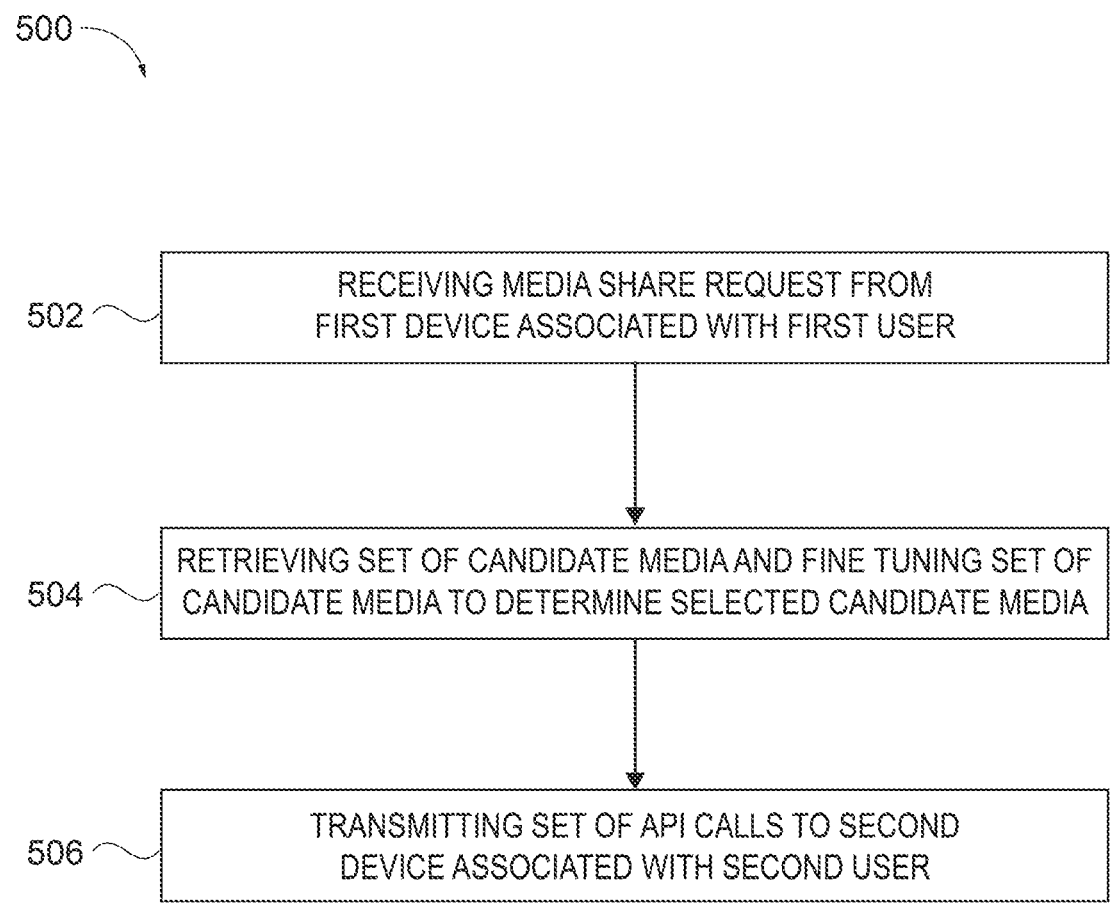
FIG. 5 is a flow diagram of a method for disparate player media sharing, according to one aspect.

FIG. 5 is a flow diagram of a method 500 for disparate player media sharing, according to one aspect. The method 500 may include receiving 502 a media share request from the first device associated with a first user, retrieving 504 a set of candidate media and fine tuning the set of candidate media to determine a selected candidate media, and transmitting 506 a set of application program interface (API) calls to the second device associated with a second user. According to one aspect, the transmitting 506 may instead transmit the metadata associated with the selected candidate media along with a pending share command, thereby enabling the second device to generate its own API call for the selected candidate media.

Figure 6:
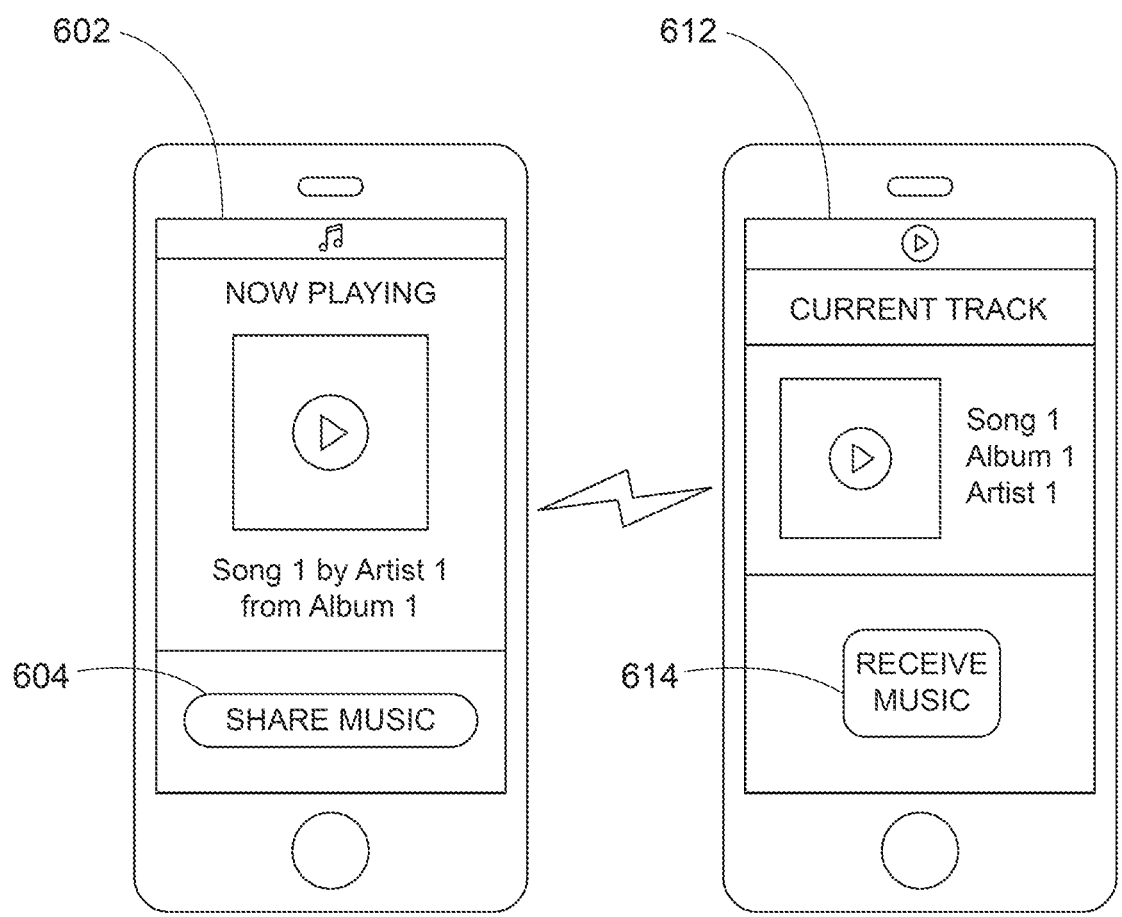
FIG. 6 is an illustration of an exemplary interface for a system for disparate player media sharing, according to one aspect.

FIG. 6 is an illustration of an exemplary interface for a system for disparate player media sharing, according to one aspect. FIG. 6 is an exemplary illustration of an interface 602 for the sharing application 116, 146 of the first device (or the second device). In this way, the first user may share media with the second user and the second user may share media with the first user. As seen in FIG. 6, a "share music" button 604 is provided for the first device in this example. Hitting the "share music" button 604 may bring up a list of contacts to share the music or media with. After the "share music" button 604 is pressed, the first device may transmit the media share request to the server 130, for example. The server 130 may retrieve a set of candidate media similar to the music currently being performed or associated with the media share request, fine tune the set of candidate media to determine a selected candidate media and transmit a set of application program interface (API) calls to the second device, thereby enabling the second device to playback the media associated with the media share request. For example, after the API call is received by the second device, a "receive music" button 614 may be presented on interface 612. When pressed, the "receive music" button 614 may cause the processor of the second device to execute the received API call, thereby launching the corresponding media application, and playing back the media associated with the media share request. Because the second user in FIG. 6 does not have the same media platform or player application installed as the first user, the second device may launch an API call automatically for a different media application for the closest available song or media (e.g., the selected candidate media).

Figure 7:
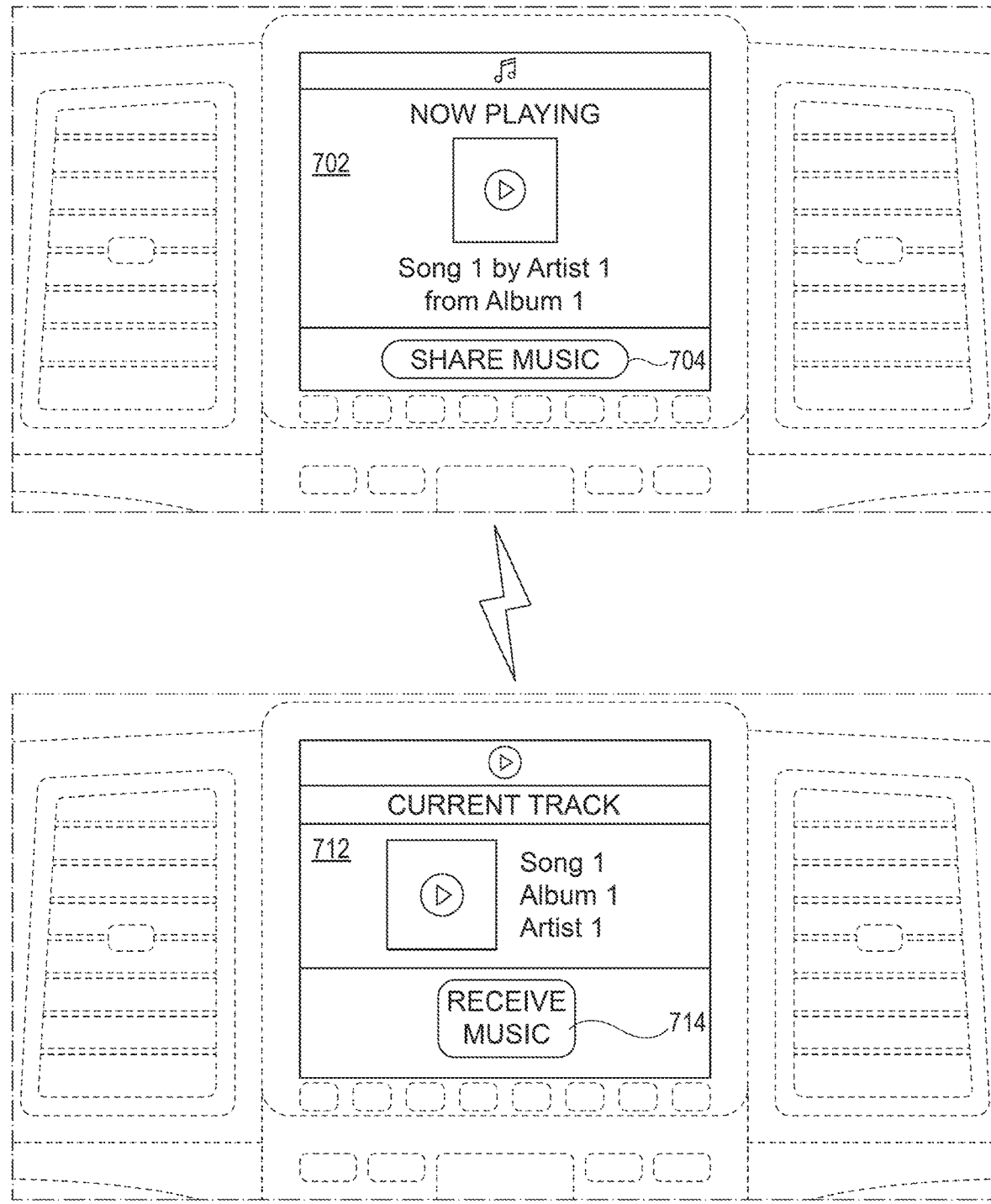
FIG. 7 is an illustration of an exemplary interface for a system for disparate player media sharing, according to one aspect.

FIG. 7 is an illustration of an exemplary interface 702 for a system for disparate player media sharing, according to one aspect. FIG. 7 is an exemplary illustration of an interface 702 for the sharing application 126, 156 of the first device or the second device. Thus, the first user may share media with the second user and vice versa. As seen in FIG. 7, a "share music" button 704 is provided for the first device in this example, where the first device may be running or executing the sharing application 126. Hitting the "share music" button 704 may bring up a list of contacts to share the music or media with. After the "share music" button 704 is pressed, the first device may transmit the media share request to the server 130, for example. The server 130 may retrieve a set of candidate media similar to the music currently being performed or associated with the media share request and fine tune the set of candidate media to determine a selected candidate media and transmit a set of application program interface (API) calls to the second device, thereby enabling the second device to playback the media associated with the media share request. Here, the second user has the same sharing application 156 (e.g., by virtue of the application being installed as a part of the vehicle operating system) and music subscription as the first user, and thus, interface 712 appears similar to interface 702. Thus, the second device may launch an API call automatically for the same media application for the identical song or media as the first user after the "receive music" button 714 is pressed, for example.

Figure 8:
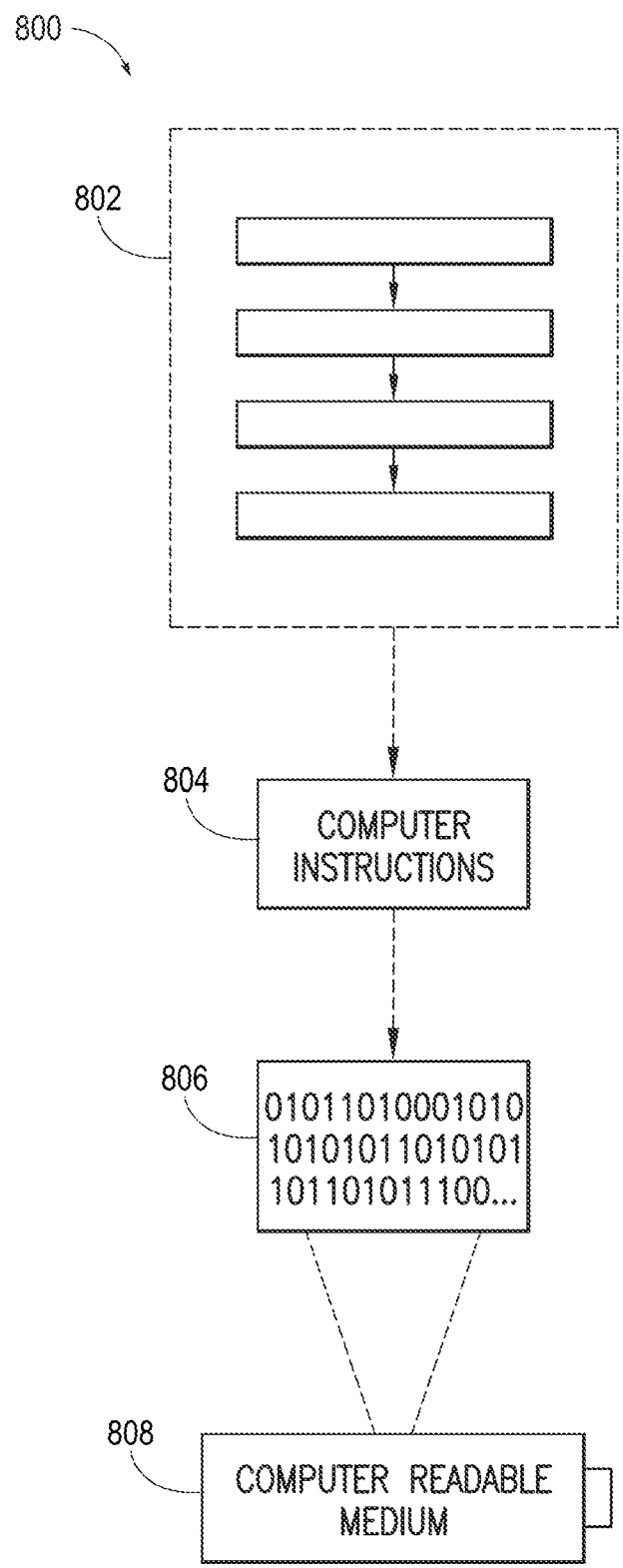
FIG. 8 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 8, wherein an implementation 800 includes a computer-readable medium 808, such as a CD-R, DVD-R, flash drive, a platter of a hard disk drive, among others, on which is encoded computer-readable data 806. This encoded computer-readable data 806, such as binary data including a plurality of zero's and one's as shown in 806, in turn includes a set of processor-executable computer instructions 804 configured to operate according to one or more of the principles set forth herein. In this implementation 800, the processor-executable computer instructions 804 may be configured to perform a method 802, such as the method 500 of FIG. 5. In another aspect, the processor-executable computer instructions 804 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 9:
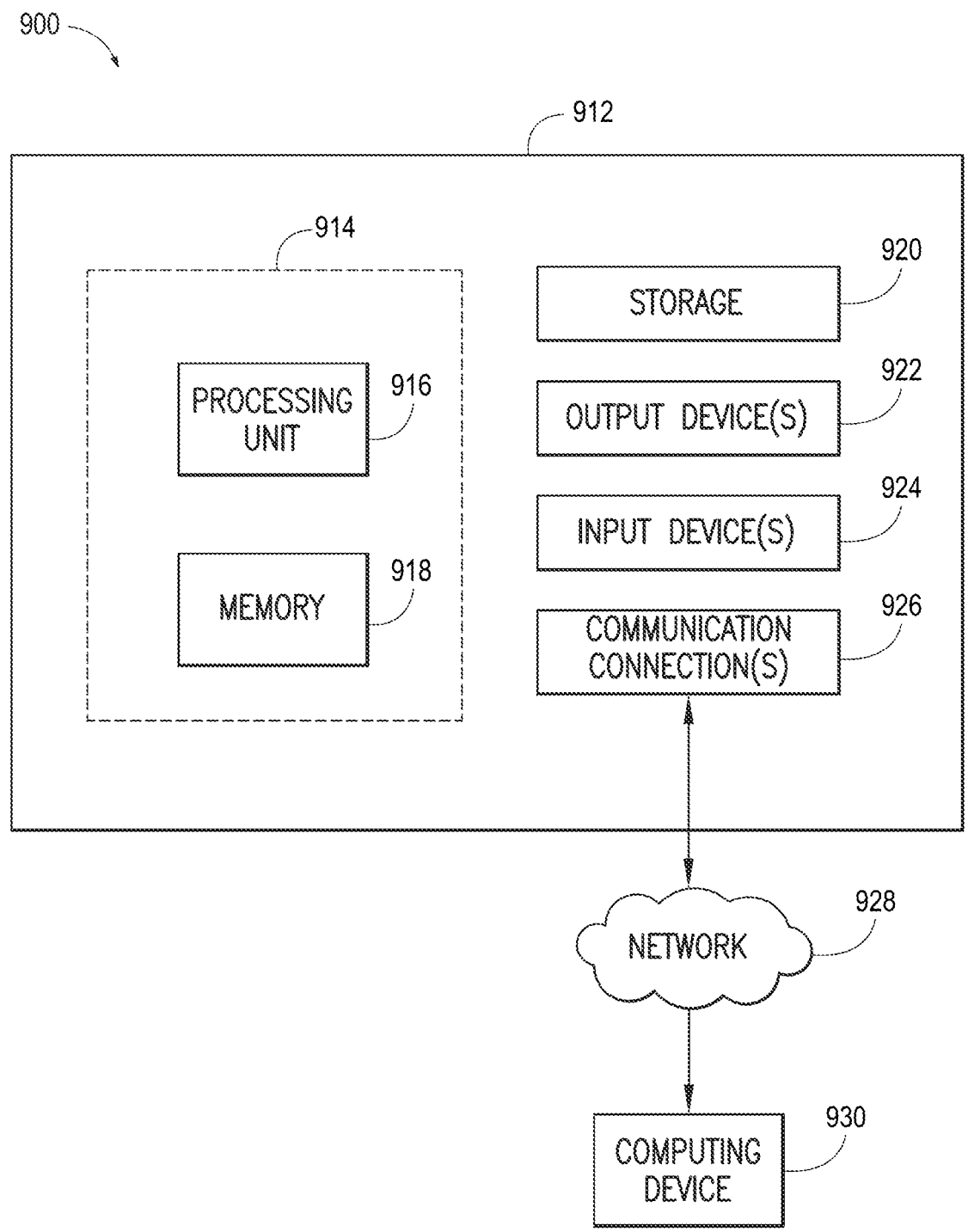
FIG. 9 is an illustration of an example computing environment where one or more of the provisions set forth herein are implemented, according to one aspect.

FIG. 9 and the following discussion provide a description of a suitable computing environment to implement aspects of one or more of the provisions set forth herein. The operating environment of FIG. 9 is merely one example of a suitable operating environment and is not intended to suggest any limitation as to the scope of use or functionality of the operating environment. Example computing devices include personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, among others.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 9 illustrates a system 900 including a computing device 912 configured to implement one aspect provided herein. In one configuration, the computing device 912 includes at least one processing unit 916 and memory 918. Depending on the exact configuration and type of computing device, memory 918 may be volatile, such as RAM, non-volatile, such as ROM, flash memory, or a combination thereof. This configuration is illustrated in FIG. 9 by dashed line 914.

In other aspects, the computing device 912 includes additional features or functionality. For example, the computing device 912 may include additional storage such as removable storage or non-removable storage, including magnetic storage, optical storage, among others. Such additional storage is illustrated in FIG. 9 by storage 920. In one aspect, computer readable instructions to implement one aspect provided herein are in storage 920. Storage 920 may store other computer readable instructions to implement an operating system, an application program, among others. Computer readable instructions may be loaded in memory 918 for execution by processing unit 916, for example.

The term "computer readable media" as used herein includes computer storage media. Computer storage media includes volatile and non-volatile, removable and non-removable media implemented in any method or technology for storage of information such as computer readable instructions or other data. Memory 918 and storage 920 are examples of computer storage media. Computer storage media includes RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 912. Any such computer storage media is part of the computing device 912.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 912 includes input device(s) 924 such as keyboard, mouse, pen, voice input device, touch input device, infrared cameras, video input devices, or any other input device. Output device(s) 922 such as one or more displays, speakers, printers, or any other output device may be included with the computing device 912. Input device(s) 924 and output device(s) 922 may be connected to the computing device 912 via a wired connection, wireless connection, or any combination thereof. In one aspect, an input device or an output device from another computing device may be used as input device(s) 924 or output device(s) 922 for the computing device 912. The computing device 912 may include communication connection(s) 926 to facilitate communications with one or more other devices 930, such as through network 928, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names for features, elements, items, etc. For example, a first channel and a second channel generally correspond to channel A and channel B or two different or two identical channels or the same channel. Additionally, "comprising", "comprises", "including", "includes", or the like means comprising or including, but not limited to.

It will be appreciated that various of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A system for sharing media, comprising:
a server:
receiving a media share request from a first device associated with a first user, the media share request including metadata pertaining to a media and a second user with whom the media is to be shared;
retrieving a set of candidate media and fine tuning the set of candidate media to determine a selected candidate media;
determining applications currently installed on a second device; and
generating and transmitting a set of application program interface (API) calls pertaining to the selected candidate media to the second device associated with the second user based on available applications currently installed on the second device,
wherein the set of API calls is resolved at a later time, when the second user launches an application currently installed on the second device.

2. The system for sharing media of claim 1, wherein the metadata includes a title, an artist, an album, or a unique media identifier.

3. The system for sharing media of claim 1, wherein the first user is subscribed to a first media service and the second user is subscribed to a second media service.

4. The system for sharing media of claim 3, wherein the server retrieves the set of candidate media and fine tunes the set of candidate media to determine the selected candidate media based on the subscription to the second media service by the second user.

5. The system for sharing media of claim 3, wherein the server transmits the set of API calls to the second device based on the subscription to the second media service by the second user.

6. The system for sharing media of claim 3, wherein the server retrieves the set of candidate media and fine tunes the set of candidate media to determine the selected candidate media based on the subscription to the second media service by the second user and the subscription to the first media service by the first user.

7. The system for sharing media of claim 3, the server transmits the set of API calls to the second device based on the subscription to the second media service by the second user and the subscription to the first media service by the first user.

8. The system for sharing media of claim 1, wherein the server transmits the set of API calls to the second device based on an application preference of the second user.

9. The system for sharing media of claim 1, wherein the set of API calls includes a Uniform Resource Locator (URL).

10. A system for sharing media, comprising:
a server:
receiving a media share request from a first device associated with a first user, the media share request including metadata pertaining to a media and a second user with whom the media is to be shared;
retrieving a set of candidate media and fine tuning the set of candidate media to determine a selected candidate media;
generating and transmitting metadata associated with the selected candidate media to a second device associated with the second user; and
determining applications currently installed on the second device,
wherein the server generates and transmits a set of application program interface (API) calls pertaining to the selected candidate media to the second device based on available applications currently installed on the second device, and
wherein the set of API calls is resolved at a later time, when the second user launches an application currently installed on the second device.

11. The system for sharing media of claim 10, wherein the metadata associated with the media share request or the metadata associated with the selected candidate media includes a title, an artist, an album, or a unique media identifier.

12. The system for sharing media of claim 10, wherein the first user is subscribed to a first media service and the second user is subscribed to a second media service.

13. The system for sharing media of claim 12, wherein the server transmits the metadata associated with the selected candidate media to the second device based on the subscription to the second media service by the second user.

14. A system for sharing media, comprising:
a server:
receiving a media share request from a first device associated with a first user, the media share request including metadata pertaining to a media and a second user with whom the media is to be shared;
generating and transmitting the metadata pertaining to the media to a second device associated with the second user; and
determining applications currently installed on the second device,
wherein the second device retrieves a set of candidate media and fine tunes the set of candidate media to determine a selected candidate media based on the received metadata pertaining to the media,
wherein the server generates and transmits a set of application program interface (API) calls to the second device based on available applications currently installed on the second device, and
wherein the set of API calls is resolved at a later time, when the second user launches an application currently installed on the second device.

15. The system for sharing media of claim 14, wherein the metadata associated with the media share request or the metadata transmitted to the second device includes a title, an artist, an album, or a unique media identifier.

16. The system for sharing media of claim 14, wherein the first user is subscribed to a first media service and the second user is subscribed to a second media service.

17. The system for sharing media of claim 16, wherein the server transmits the metadata pertaining to the media to the second device based on the subscription to the second media service by the second user.

18. The system for sharing media of claim 14, wherein the second user is not subscribed to any media service.

19. The system for sharing media of claim 14, wherein the server transmits the metadata pertaining to the media to the second device based on the second user having no subscription to any media service.

* * * * *